United States Patent
Xu et al.

(10) Patent No.: US 9,698,950 B2
(45) Date of Patent: Jul. 4, 2017

(54) METHOD AND APPARATUS FOR DEMODULATING PHYSICAL RANDOM ACCESS CHANNEL SIGNAL

(71) Applicant: HUAWEI TECHNOLOGIES CO., LTD., Shenzhen (CN)

(72) Inventors: Xinyu Xu, Shanghai (CN); Changyu Guo, Shanghai (CN); Wei Su, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 14/723,597

(22) Filed: May 28, 2015

(65) Prior Publication Data

US 2015/0263838 A1 Sep. 17, 2015

Related U.S. Application Data

(63) Continuation of application No. PCT/CN2012/085627, filed on Nov. 30, 2012.

(51) Int. Cl.
*H04L 12/815* (2013.01)
*H04W 74/08* (2009.01)
(Continued)

(52) U.S. Cl.
CPC .............. *H04L 5/0048* (2013.01); *H04L 1/00* (2013.01); *H04L 5/005* (2013.01); *H04L 27/26* (2013.01);
(Continued)

(58) Field of Classification Search
CPC H04W 74/08; H04W 74/0833; H04L 5/0048; H04L 1/00; H04L 47/225; H04L 27/26
See application file for complete search history.

(56) References Cited

U.S. PATENT DOCUMENTS

2011/0268101 A1* 11/2011 Wang .................... H04L 5/0053
370/344
2011/0305179 A1* 12/2011 Wang .................... H04L 1/0031
370/311
(Continued)

FOREIGN PATENT DOCUMENTS

CN    101127536    2/2008
CN    101394263    3/2009
(Continued)

OTHER PUBLICATIONS

PCT International Search Report dated Sep. 5, 2013 in corresponding International Patent Application No. PCT/CN2012/085627.
(Continued)

*Primary Examiner* — Brian D Nguyen
(74) *Attorney, Agent, or Firm* — Staas & Halsey LLP

(57) ABSTRACT

Embodiments of the present invention provide a method and an apparatus for demodulating a physical random access channel signal. The method includes: acquiring a down-sampling sequence of a PRACH demodulation signal, and acquiring a power sequence of the down-sampling sequence; determining a position of a sounding reference signal sampling point in the down-sampling sequence according to the power sequence; and eliminating the sounding reference signal sampling point in the down-sampling sequence according to the position of the sounding reference signal sampling point, so as to perform PRACH coherent detection on a down-sampling sequence obtained after the sounding reference signal sampling point is eliminated. In the method and the apparatus for demodulating a physical random access channel signal in the embodiments of the present invention, interference from a sounding reference signal can be restrained and false alarms in PRACH detection can be reduced.

20 Claims, 5 Drawing Sheets

(51) Int. Cl.
*H04L 5/00* (2006.01)
*H04L 27/26* (2006.01)
*H04L 1/00* (2006.01)

(52) U.S. Cl.
CPC ........ *H04L 27/2647* (2013.01); *H04L 47/225* (2013.01); *H04W 74/08* (2013.01); *H04W 74/0833* (2013.01)

(56) References Cited

U.S. PATENT DOCUMENTS

| | | | | |
|---|---|---|---|---|
| 2012/0069793 | A1* | 3/2012 | Chung | H04B 7/15542 370/315 |
| 2012/0106501 | A1* | 5/2012 | Kishiyama | H04L 1/0026 370/330 |
| 2012/0320805 | A1* | 12/2012 | Yang | H04L 1/18 370/280 |

FOREIGN PATENT DOCUMENTS

| | | |
|---|---|---|
| CN | 101489254 | 7/2009 |
| CN | 101500264 | 8/2009 |

OTHER PUBLICATIONS

Chu, "Polyphase Codes With Good Periodic Correlation Properties", IEEE Transactions on Information Theory, Jul. 1972, pp. 531-532.

"3$^{rd}$ Generation Partnership Project; Technical Specification Group Radio Access Network; Evolved Universal Terrestrial Radio Access (E-UTRA); Physical Channels and Modulation (Release 11)", 3GPP TS 36.211, V11.0.0, Sep. 2012, pp. 1-106.

"Research and implementation of wireless spread spectrum communication system and multi user interference suppression method", University of Electronic Science and Technology of China. Apr.-May 2009, 91 pp.

International Search Report mailed Sep. 5, 2013 in corresponding international application PCT/CN2012/085627.

* cited by examiner

METHOD AND APPARATUS FOR DEMODULATING PHYSICAL RANDOM ACCESS CHANNEL SIGNAL

CROSS-REFERENCE TO RELATED APPLICATIONS

This application is a continuation of International Application No. PCT/CN2012/085627, filed on Nov. 30, 2012, which is hereby incorporated by reference in its entirety.

TECHNICAL FIELD

The present invention relates to the field of communications, and in particular, to a method and an apparatus for demodulating a physical random access channel signal.

BACKGROUND

In a long term evolution system (Long Term Evolution, LTE), as an emerging mobile long term evolution technology, many new technologies are adopted, and four uplink channels, namely, a physical uplink shared channel (Physical Uplink Shared Channel, PUSCH), a physical uplink control channel (Physical Uplink Control Channel, PUCCH), a physical random access channel (Physical Random Access Channel, PRACH), and a sounding reference signal (Sounding Reference Signal, SRS) are defined. The PRACH is used for random access of a user equipment (User Equipment, UE), and the sounding reference signal is used for measuring uplink channel information.

A signal sent by a UE on a PRACH channel is called a preamble sequence (Preamble Sequence), and the PRACH occupies resources of 6 consecutive resource blocks (Resource Block, RB) in a frequency domain. The preamble sequence is a Zadoff-Chu (ZC) sequence, with a length of 839 points.

A ZC sequence is a classic sequence that satisfies a constant amplitude zero autocorrelation (constant amplitude zero autocorrelation, CAZAC) sequence feature, with a mathematic definition as follows:

when N is an even number, $$x_u(n) = e^{-j\frac{u\pi n^2}{N}} \quad 0 \le n < N;$$

and
when N is an odd number, $$x_u(n) = e^{-j\frac{u\pi n(n+1)}{N}} \quad 0 \le n < N.$$

In the foregoing formulas, ZC sequences with different values of u are called different physical root sequences. A value range of u is (1, 838).

The ZC sequence has good autocorrelation and cross correlation, and these features of ZC are an important basis for coherent demodulation detection of the PRACH.

The ZC sequence has a good autocorrelation feature: Except that an initial point is N, other points are all 0s:

$$R_u(l) = \sum_{k=0}^{N-1} x_u(k) \cdot x_u^*(k+l) = \begin{cases} N, & l = 0 \\ 0, & l = \text{others} \end{cases}$$

Result amplitudes of cross correlation between ZC sequences are almost all equal to Sqrt(N):

$$R_u(l) = \sum_{k=0}^{N-1} x_u(k) \cdot x_v^*(k+l) \approx \sqrt{N}$$

A sounding reference signal also comes from a change of a ZC sequence. A sounding reference signal sequence traverses a whole sounding reference signal cell frequency band in a certain time period, and the sounding reference signal cell frequency band is configured by a higher layer, and is related to a bandwidth. In this way, a conflict inevitably occurs between a frequency domain position of the PRACH and a frequency domain position of the sounding reference signal sequence.

When coherent demodulation is performed on a PRACH sequence, a difference between a length of the sounding reference signal sequence and a length of the PRACH sequence results in that the sounding reference signal sequence may seriously damage the cross correlation of the ZC sequence during the coherent demodulation. As a result, whether a peak value after the PRACH sequence is correlated is an autocorrelation value of the PRACH sequence or a cross correlation value introduced due to the sounding reference signal sequence cannot be identified.

In an actual LTE network, a time-frequency domain position of a sounding reference signal of a neighboring cell or a local cell may overlap with a time-frequency domain position of a PRACH of the local cell. The sounding reference signal sequence and a PRACH preamble sequence both belong to ZC sequences, and the two are different in length, so that as described above, reflected cross correlation is not good. When there is no access from a user, the sounding reference signal of the neighboring cell or the sounding reference signal of the local cell incurs interference to PRACH detection of the local cell, and a serious false alarm may be generated in the PRACH detection.

For this case, the present invention provides a method and an apparatus for demodulating a physical random access channel signal, so as to restrain the interference from the sounding reference signal and reduce false alarms in the PRACH detection.

SUMMARY

Embodiments of the present invention provide a method and an apparatus for demodulating a PRACH signal, which can restrain interference from a sounding reference signal and reduce false alarms in PRACH detection.

In a first aspect, a method for a PRACH signal is provided and includes:

acquiring a down-sampling sequence of a PRACH demodulation signal, and acquiring a power sequence of the down-sampling sequence;

determining a position of a sounding reference signal sampling point in the down-sampling sequence according to the power sequence; and eliminating the sounding reference signal sampling point in the down-sampling sequence according to the position of the sounding reference signal sampling point, so as to perform PRACH coherent detection on a down-sampling sequence obtained after the sounding reference signal sampling point is eliminated.

With reference to the first aspect, in a first possible implementation manner of the first aspect, the determining a position of a sounding reference signal sampling point in the down-sampling sequence includes:

performing window sliding processing on the power sequence according to a first preset value and a preset sliding window, so as to determine a first window set, where a sum of numerical values of sampling points in any window in the first window set is larger than the first preset value; and determining a position corresponding to a sampling point in a window of the first window set as the position of the sounding reference signal.

With reference to the first possible implementation manner of the first aspect, in a second possible implementation manner of the first aspect, the performing window sliding processing on the power sequence, so as to determine a first window set, includes:

sequentially performing window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

With reference to the first possible implementation manner of the first aspect, in a third possible implementation manner of the first aspect, the performing window sliding processing on the power sequence, so as to determine a first window set, includes:

performing window sliding processing on all sampling points in the power sequence, acquiring a first window, where a sum of sampling points in the window is larger than the first preset value and is the largest, and setting the numerical values of the sampling points in the first window to an average value of the sampling points of the power sequence;

performing window sliding processing on all the sampling points of the power sequence, where numerical values of sampling points in a $(j−1)^{th}$ window have been set to the average value of the sampling points of the power sequence, acquiring a $j^{th}$ window, where a sum of sampling points in the window is larger than the first preset value and is the largest, and setting the numerical values of the sampling points in the $j^{th}$ window to the average value of the sampling points of the power sequence, where j is larger than 1 and is smaller than or equal to J−1;

performing window sliding processing on all the sampling points of the power sequence, where numerical values of sampling points in a $(J−1)^{th}$ window have been set to the average value of the sampling points of the power sequence, and acquiring a $J^{th}$ window, where a sum of sampling points in the window is the largest, the sum of the numerical values of the sampling points in the $J^{th}$ window is no larger than the first preset value, and a sum of the numerical values of the sampling points in the $(J−1)^{th}$ window is larger than the first preset value; and determining the first window set, where the first window set includes a window, where a sum of sampling points in the window is the largest and larger than the first preset value each time window sliding processing is performed on all the sampling points of the power sequence.

With reference to the first aspect, in a fourth possible implementation manner of the first aspect, the determining a position of a sounding reference signal sampling point in the down-sampling sequence includes:

performing window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and determining a position corresponding to a sampling point in a window of the second window set as the position of the sounding reference signal.

With reference to the fourth possible implementation manner of the first aspect, in a fifth possible implementation manner of the first aspect, the performing window sliding processing on the power sequence, so as to determine a second window set, includes:

sequentially performing window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

With reference to the fourth possible implementation manner of the first aspect, in a sixth possible implementation manner of the first aspect, the performing window sliding processing on the power sequence, so as to determine a second window set, includes:

sequentially performing window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes K windows, where a sum of numerical values of sampling points in each of the windows is larger than the first preset value.

With reference to the fourth possible implementation manner of the first aspect, in a seventh possible implementation manner of the first aspect, the performing window sliding processing on the power sequence, so as to determine a second window set, includes:

performing window sliding processing on all sampling points in the power sequence, acquiring a first window, where a sum of sampling points in the window is larger than the first preset value and is the largest, and setting the numerical values of the sampling points in the first window to an average value of the sampling points of the power sequence;

performing window sliding processing on all the sampling points of the power sequence, where numerical values of sampling points in a $(g-1)^{th}$ window have been set to the average value of the sampling points of the power sequence, acquiring a $g^{th}$ window, where a sum of sampling points in the window is larger than the first preset value and is the largest, and setting the numerical values of the sampling points in the $g^{th}$ window to the average value of the sampling points of the power sequence, where g is larger than 1 and is smaller than or equal to G−1;

performing window sliding processing on all the sampling points of the power sequence, where numerical values of sampling points in a $(G-1)^{th}$ window have been set to the average value of the sampling points of the power sequence, and acquiring a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determining the second window set, where the second window set includes a window, where a sum of sampling points in the window is the largest and larger than the first preset value each time window sliding processing is performed on all the sampling points of the power sequence.

With reference to the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the second preset value is preset according to the number of sounding reference signal sources and the preset window.

With reference to the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the first preset value is obtained according to a preset false alarm probability.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner of the first aspect, the eliminating the sounding reference signal sampling point includes:

setting a value of a sampling point at the position of the sounding reference signal sampling point in the down-sampling sequence to 0 according to the position of the sounding reference signal sampling point.

In a second aspect, an apparatus for demodulating a PRACH signal is provided and includes:

an acquiring unit, configured to acquire a down-sampling sequence of a PRACH demodulation signal, and acquire a power sequence of the down-sampling sequence;

a determining unit, configured to determine a position of a sounding reference signal sampling point in the down-sampling sequence according to the power sequence; and an eliminating unit, configured to eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

With reference to the second aspect, in a first possible implementation manner of the second aspect, the determining unit includes:

a first determining subunit, configured to perform window sliding processing on the power sequence according to a first preset value and a preset sliding window, so as to determine a first window set, where a sum of numerical values of sampling points in any window in the first window set is larger than the first preset value; and a second determining subunit, configured to determine a position corresponding to a sampling point in a window of the first window set as the position of the sounding reference signal.

With reference to the first possible implementation manner of the second aspect, in a second possible implementation manner of the second aspect, the first determining subunit is specifically configured to:

sequentially perform window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

With reference to the first possible implementation manner of the second aspect, in a third possible implementation manner of the second aspect, the first determining subunit is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(j-1)^{th}$ window have been set to the average value of the sampling points of the power sequence, acquire a $j^{th}$ window, where a sum of sampling points in the window is larger than the first preset value and is the largest, and set the numerical values of the sampling points in the $j^{th}$ window to the average value of the sampling points of the power sequence, where j is larger than 1 and is smaller than or equal to J−1;

perform window sliding processing on all the sampling points of the power sequence, where numerical values of sampling points in a $(J-1)^{th}$ window have been set to the average value of the sampling points of the power sequence, and acquire a $J^{th}$ window, where a sum of sampling points in the window is the largest, the sum of the numerical values of the sampling points in the $J^{th}$ window is no larger than the first preset value, and a sum of the numerical values of the sampling points in the $(J-1)^{th}$ window is larger than the first preset value; and determine the first window set, where the first window set includes a window, where a sum of sampling points in the window is the largest and larger than the first preset value each time window sliding processing is performed on all the sampling points of the power sequence.

With reference to the second aspect, in a fourth possible implementation manner of the second aspect, the determining unit includes:

a third determining subunit, configured to perform window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and a fourth determining subunit, configured to determine a position corresponding to a sampling point in a window of the second window set as the position of the sounding reference signal.

With reference to the fourth possible implementation manner of the second aspect, in a fifth possible implementation manner of the second aspect, the third determining subunit is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

With reference to the fourth possible implementation manner of the second aspect, in a sixth possible implementation manner of the second aspect, the third determining subunit is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes K windows, where a sum of numerical values of sampling points in each of the windows is larger than the first preset value.

With reference to the fourth possible implementation manner of the second aspect, in a seventh possible implementation manner of the second aspect, the third determining subunit is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(g-1)^{th}$ window have been set to the average value of the sampling points of the power sequence, acquire a $g^{th}$ window, where a sum of sampling points in the window is larger than the first preset value and is the largest, and set the numerical values of the sampling points in the $g^{th}$ window to the average value of the sampling points of the power sequence, where g is larger than 1 and is smaller than or equal to G−1;

perform window sliding processing on all the sampling points of the power sequence, where numerical values of sampling points in a $(G-1)^{th}$ window have been set to the average value of the sampling points of the power sequence, and acquire a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determine the second window set, where the second window set includes a window, where a sum of sampling points in the window is the largest and larger than the first preset value each time window sliding processing is performed on all the sampling points of the power sequence.

With reference to the fourth possible implementation manner of the second aspect, the fifth possible implementation manner of the second aspect, the sixth possible implementation manner of the second aspect, or the seventh possible implementation manner of the second aspect, in an eighth possible implementation manner of the second aspect, the second preset value is preset according to the number of sounding reference signal sources and the preset window.

With reference to the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner of the second aspect, the first preset value is obtained according to a preset false alarm probability.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect, or the ninth possible implementation manner of the second aspect, in a tenth possible implementation manner of the second aspect, the eliminating unit is specifically configured to:

set a value of a sampling point at the position of the sounding reference signal sampling point in the down-sampling sequence to 0 according to the position of the sounding reference signal sampling point.

In a third aspect, an apparatus for demodulating a PRACH signal is provided and includes:

a receiver, configured to receive a PRACH demodulation signal; and a processor, configured to acquire a down-sampling sequence of the PRACH demodulation signal, acquire a power sequence of the down-sampling sequence, determine a position of a sounding reference signal sampling point in the down-sampling sequence according to the power sequence, and eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

With reference to the third aspect, in a first possible implementation manner of the third aspect, the processor is specifically configured to:

perform window sliding processing on the power sequence according to a first preset value and a preset sliding window, so as to determine a first window set, where a sum of numerical values of sampling points in any window in the first window set is larger than the first preset value; and determine a position corresponding to a sampling point in a window of the first window set as the position of the sounding reference signal.

With reference to the first possible implementation manner of the third aspect, in a second possible implementation manner of the third aspect, the processor is specifically configured to:

sequentially perform window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

With reference to the first possible implementation manner of the third aspect, in a third possible implementation manner of the third aspect, the processor is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(j-1)^{th}$ window have been set to the average value of the sampling points of the power sequence, acquire a $j^{th}$ window, where a sum of sampling points in the window is larger than the first preset value and is the largest, and set the numerical values of the sampling points in the $j^{th}$ window to the average value of the sampling points of the power sequence, where j is larger than 1 and is smaller than or equal to J−1;

perform window sliding processing on all the sampling points of the power sequence, where numerical values of sampling points in a $(J-1)^{th}$ window have been set to the average value of the sampling points of the power sequence, and acquire a $J^{th}$ window, where a sum of sampling points in the window is the largest, the sum of the numerical values of the sampling points in the $J^{th}$ window is no larger than the first preset value, and a sum of the numerical values of the sampling points in the $(J-1)^{th}$ window is larger than the first preset value; and determine the first window set, where the first window set includes a window, where a sum of sampling points in the window is the largest and larger than the first preset value each time window sliding processing is performed on all the sampling points of the power sequence.

With reference to the third aspect, in a fourth possible implementation manner of the third aspect, the processor is specifically configured to:

perform window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and determine a position corresponding to a sampling point in a window of the second window set as the position of the sounding reference signal.

With reference to the fourth possible implementation manner of the third aspect, in a fifth possible implementation manner of the third aspect, the processor is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

With reference to the fourth possible implementation manner of the third aspect, in a sixth possible implementation manner of the third aspect, the processor is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes K windows, where a sum of numerical values of sampling points in each of the windows is larger than the first preset value.

With reference to the fourth possible implementation manner of the third aspect, in a seventh possible implementation manner of the third aspect, the processor is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(g-1)^{th}$ window have been set to the average value of the sampling points of the power sequence, acquire a $g^{th}$ window, where a sum of sampling points in the window is larger than the first preset value and is the largest, and set the numerical values of the sampling points in the $g^{th}$ window to the average value of the sampling points of the power sequence, where g is larger than 1 and is smaller than or equal to G−1;

perform window sliding processing on all the sampling points of the power sequence, where numerical values of sampling points in a $(G-1)^{th}$ window have been set to the average value of the sampling points of the power sequence, and acquire a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determine the second window set, where the second window set includes a window, where a sum of sampling points in the window is the largest and larger than the first preset value each time window sliding processing is performed on all the sampling points of the power sequence.

With reference to the fourth possible implementation manner of the third aspect, the fifth possible implementation manner of the third aspect, the sixth possible implementation manner of the third aspect, or the seventh possible implementation manner of the third aspect, in an eighth possible implementation manner of the third aspect, the second preset value is preset according to the number of sounding reference signal sources and the preset window.

With reference to the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner of the third aspect, the first preset value is obtained according to a preset false alarm probability.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, or the ninth possible implementation manner of the third aspect, in a tenth possible implementation manner of the third aspect, the processor is specifically configured to:

set a value of a sampling point at the position of the sounding reference signal sampling point in the down-sampling sequence to 0 according to the position of the sounding reference signal sampling point.

Therefore, in the embodiments of the present invention, a down-sampling sequence of a PRACH demodulation signal is acquired, a power sequence of the down-sampling sequence is acquired, a position of a sounding reference signal sampling point in the down-sampling sequence is determined according to the power sequence, and the sounding reference signal sampling point is eliminated according to the position of the sounding reference signal sampling point, so as to perform PRACH coherent detection on a down-sampling sequence obtained after the sounding reference signal sampling point is eliminated. In this way, interference from a sounding reference signal can be restrained, and false alarms in PRACH detection can be reduced.

BRIEF DESCRIPTION OF DRAWINGS

To describe the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Before specific embodiments are introduced, a time domain feature of a sounding reference signal is described first.

As seen from a time domain signal, by taking a scenario of 20M and an FDD Format0 format as an example, where the solutions of the present invention are also applicable to other Formats, a single Preamble of a PRACH has a time length of 800 us, while a sounding reference signal occupies one OFDM symbol in a time domain with a length of 71.4 us (Normal CP)/83.3 us (Extended CP). Due to a large time length difference between the sounding reference signal and the PRACH, a time domain position of the sounding reference signal can be obtained according to that power of a place where time domain positions of the sounding reference signal and the PRACH overlap is larger than that of other positions when the PRACH and the sounding reference signal exist. When the sounding reference signal exists without the PRACH, the time domain position of the sounding reference signal can be obtained because signal strength at the sounding reference signal is larger than that at other places.

Therefore, the time domain position of the sounding reference signal can be obtained according to the time domain feature of the sounding reference signal, and then the sounding reference signal is eliminated, so as to restrain the influence of the sounding reference signal on PRACH demodulation.

Figure 1:
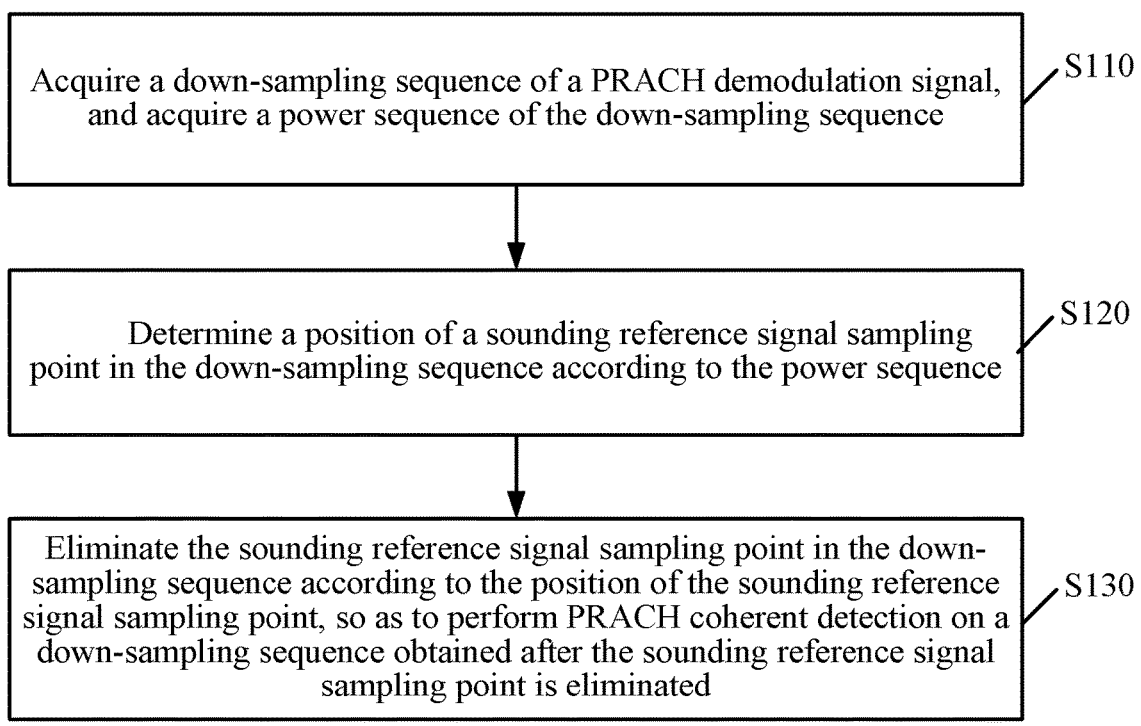
FIG. 1 is a schematic flow chart of a method for demodulating a PRACH signal according to an embodiment of the present invention.

FIG. 1 is a schematic flow chart of a method 100 for demodulating a PRACH signal according to an embodiment of the present invention. As shown in FIG. 1, the method 100 includes:

S110: Acquire a down-sampling sequence of a PRACH demodulation signal, and acquire a power sequence of the down-sampling sequence.

S120: Determine a position of a sounding reference signal sampling point in the down-sampling sequence according to the power sequence.

S130: Eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

In the embodiment of the present invention, after frequency domain migration and filtering decimation of a PRACH demodulation signal is performed to obtain a down-sampling sequence of the PRACH demodulation signal, signal simulation may be performed on the down-sampling sequence, so as to obtain a power sequence corresponding to the down-sampling sequence. Next, a position of a sounding reference signal sampling point in the down-sampling sequence may be determined according to the power sequence, where a place with a larger numerical value in the power sequence is the position of the sounding reference signal sampling point. Next, the sounding reference signal sampling point may be eliminated in the down-sampling sequence according to the position of the sounding reference signal sampling point, where the sounding reference signal sampling point may be eliminated in a manner of setting a sampling point at the position of the sounding reference signal sampling point in the down-sampling power sequence to 0. Next, PRACH coherent detection may be performed on a down-sampling sequence obtained after the sounding reference signal sampling point is eliminated. For example, the down-sampling sequence obtained after the sounding reference signal sampling point is eliminated may be correlated to a local sequence, the correlated sequences are changed to a time domain, a delay power spectrum is obtained after simulation, and whether a user exists may be detected by detecting a related peak value of the delay power spectrum and comparing the related peak value with a threshold; meanwhile, a round trip transmission delay of the user may also be obtained through a position of the related peak value. Certainly, the PRACH coherent detection may also be implemented in other manners in the embodiment of the present invention, which is not limited in the embodiment of the present invention.

In the embodiment of the present invention, in a case that multiple antennas exist, signal simulation may be performed on a down-sampling sequence obtained for each antenna, so as to obtain a power sequence corresponding to each antenna, and then power sequences of the multiple antennas are combined for subsequent processing.

In the embodiment of the present invention, after the power sequence is obtained by performing signal simulation on the down-sampling sequence, average power corresponding to the power sequence may be calculated, then normalization processing is performed, by using the average power, on the power sequence obtained by performing simulation on the down-sampling sequence, and then, the position of the sounding reference signal sampling point is determined according to a sequence after the normalization processing. In the embodiment of the present invention, a power sequence used to determine the position of the sounding reference signal sampling point may be a power sequence before normalization processing, and may also be a power sequence after normalization processing, which is not limited in the embodiment of the present invention.

In the embodiment of the present invention, the power sequence may be processed in a sliding window filtering manner, so as to determine the position of the sounding reference signal sampling point.

In the embodiment of the present invention, the determining a position of a sounding reference signal sampling point in the down-sampling sequence in S120 may include:

performing window sliding processing on the power sequence according to a first preset value and a preset sliding window, so as to determine a first window set, where a sum of numerical values of sampling points in any window in the first window set is larger than the first preset value; and determining a position corresponding to a sampling point in a window of the first window set as the position of the sounding reference signal.

In the embodiment of the present invention, the performing window sliding processing on the power sequence, so as to determine a first window set, may include:

sequentially performing window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

Specifically, window sliding processing may be sequentially performed on the sampling points of the power sequence through the preset sliding window. When a sum of numerical values of power sampling points in a window is larger than the first preset value, the power sampling points in the window may be set to the average value of the sampling points of the power sequence, or only a power sampling point which is in the window and belongs to a next window is set to the average value of the sampling points of the power sequence, and then the next window is processed. If a sum of numerical values of power sampling points in the next window is also larger than the first preset value, the power sampling points in the next window may be set to the average value of the sampling points of the power sequence, or only a power sampling point which is in the window and belongs to a still next window is set to the average value of the sampling points of the power sequence, and then the still next window is processed. If a sum of numerical values of power sampling points in the still next window is no larger than the first preset value, the still next window may not be processed, and a yet next window is processed directly, until window sliding processing is performed on all the sampling points. Next, the position of the sounding reference signal may be determined according to positions of power sampling points in all windows, where a sum of numerical values of power sampling points in each of the windows is larger than the first preset value.

In the embodiment of the present invention, the performing window sliding processing on the power sequence, so as to determine a first window set, may also include:

performing window sliding processing on all sampling points in the power sequence, acquiring a first window, where a sum of sampling points in the window is larger than the first preset value and is the largest, and setting the numerical values of the sampling points in the first window to an average value of the sampling points of the power sequence;

performing window sliding processing on all the sampling points of the power sequence, where numerical values of sampling points in a $(j-1)^{th}$ window have been set to the average value of the sampling points of the power sequence, acquiring a $j^{th}$ window, where a sum of sampling points in the window is larger than the first preset value and is the largest, and setting the numerical values of the sampling points in the $j^{th}$ window to the average value of the sampling points of the power sequence, where j is larger than 1 and is smaller than or equal to J−1;

performing window sliding processing on all the sampling points of the power sequence, where numerical values of sampling points in a $(J-1)^{th}$ window have been set to the average value of the sampling points of the power sequence, and acquiring a $J^{th}$ window, where a sum of sampling points in the window is the largest, the sum of the numerical values of the sampling points in the $J^{th}$ window is no larger than the first preset value, and a sum of the numerical values of the sampling points in the $(J-1)^{th}$ window is larger than the first preset value; and determining the second window set, where the second window set includes a window, where a sum of sampling points in the window is the largest and larger than the first preset value each time window sliding processing is performed on all the sampling points of the power sequence.

Specifically, window sliding processing may be performed on all the sampling points of the power sequence, a window is acquired, where a sum of numerical values of sampling points in the window is the largest and larger than the first preset value, and the numerical values of the sampling points in the window are set to the average value of the sampling points of the power sequence. Next, window sliding processing is performed again on all the sampling points of the power sequence, a window is acquired, where a sum of numerical values of sampling points in the window is the largest and larger than the first preset value, and the numerical values of the sampling points in the window are set to the average value of the sampling points of the power sequence. The rest may be deduced by analogy until a window is acquired, where a sum of numerical values of power sampling points in the window is no larger than the first preset value. In this way, a position corresponding to a sampling point in a window may be determined as the position of the sounding reference signal sampling point, where a sum of numerical values of sampling points in the window is the largest and larger than the first preset value in each cyclic process of window sliding processing.

In the embodiment of the present invention, the determining a position of a sounding reference signal sampling point in the down-sampling sequence in S120 may also include:

performing window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and determining a position corresponding to a sampling point in a window of the second window set as the position of the sounding reference signal.

In the embodiment of the present invention, the performing window sliding processing on the power sequence, so as to determine a second window set, may include:

sequentially performing window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes windows, where a sum of numerical values of sampling points in each of the windows is larger than the first preset value.

Specifically, window sliding processing may be sequentially performed on the sampling points of the power sequence through the preset sliding window. When a sum of numerical values of power sampling points in a window is larger than the first preset value, the power sampling points in the window may be set to the average value of the sampling points of the power sequence, or only a power sampling point which is in the window and belongs to a next window is set to the average value of the sampling points of the power sequence, and then the next window is processed. If a sum of numerical values of power sampling points in the next window is also larger than the first preset value, the power sampling points in the next window may be set to the average value of the sampling points of the power sequence, or only a power sampling point which is in the window and belongs to a still next window is set to the average value of the sampling points of the power sequence, and then the still next window is processed. If a sum of numerical values of power sampling points in the still next window is no larger than the first preset value, the still next window may not be processed, and a yet next window is processed directly, until K windows are obtained, where a sum of numerical values of power sampling points in each of the windows is larger than the first preset value, so that sampling points in a down-sampling sequence corresponding to power sampling points in the K windows may be set to 0. After the K windows are acquired, if window sliding processing is not yet performed on all the sampling points of the power, the sliding processing may be stopped, or the window sliding processing may be continued on a remaining sampling point in the power sequence in the foregoing manner. Next, the number of windows may be determined, where a sum of numerical values of power sampling points in each of the windows is larger than the first preset value, and if the number is larger than K, the number may be reported to a higher layer, and the higher layer may preset the second preset value again according to the number. Certainly, in the embodiment of the present invention, if the number of windows acquired by sequentially performing window sliding processing on all the sampling points of the power sequence is smaller than K, where the sum of the numerical values of the power sampling points in each of the windows is larger than the first preset value, the number may also be reported to the higher layer.

Alternatively, in the embodiment of the present invention, the performing window sliding processing on the power sequence, so as to determine a second window set, may include:

sequentially performing window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

Specifically, window sliding processing may be sequentially performed on the sampling points of the power sequence through the preset sliding window. When a sum of numerical values of power sampling points in a window is larger than the first preset value, the power sampling points in the window may be set to the average value of the sampling points of the power sequence, or only a power sampling point which is in the window and belongs to a next window is set to the average value of the sampling points of the power sequence, and then the next window is processed. If a sum of numerical values of power sampling points in the next window is also larger than the first preset value, the power sampling points in the next window may be set to the average value of the sampling points of the power sequence, or only a power sampling point which is in the window and belongs to a still next window is set to the average value of the sampling points of the power sequence, and then the still next window is processed. If a sum of numerical values of power sampling points in the still next window is no larger than the first preset value, the still next window may not be processed, and a yet next window is processed directly, until window sliding processing is performed on all the sampling points of the power sequence. Next, the second window set may be determined, where the second window set includes a window, where a sum of numerical values of sampling points in the window is larger than the first preset value and the window belongs to the first K windows. Next, a sampling point of a down-sampling sequence corresponding to the sampling points in the windows of the second window set may be set to 0. It should be noted that, if the number of the windows is smaller than K, where a sum of numerical values of sampling points in each of the windows is larger than the first preset value, the number of windows included in the second window set is also smaller than K; if the number of the windows is larger than or equal to K, where a sum of numerical values of sampling points in each of the windows is larger than the first preset value, the number of the windows included in the second window set is equal to K.

The performing window sliding processing on the power sequence, so as to determine a second window set, may also include:

performing window sliding processing on all sampling points in the power sequence, acquiring a first window, where a sum of sampling points in the window is larger than the first preset value and is the largest, and setting the numerical values of the sampling points in the first window to an average value of the sampling points of the power sequence;

performing window sliding processing on all the sampling points of the power sequence, where numerical values of sampling points in a $(g-1)^{th}$ window have been set to the average value of the sampling points of the power sequence, acquiring a $g^{th}$ window, where a sum of sampling points in the window is larger than the first preset value and is the largest, and setting the numerical values of the sampling points in the $g^{th}$ window to the average value of the sampling points of the power sequence, where g is larger than 1 and is smaller than or equal to G-1;

performing window sliding processing on all the sampling points of the power sequence, where numerical values of sampling points in a $(G-1)^{th}$ window have been set to the average value of the sampling points of the power sequence, and acquiring a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determining the second window set, where the second window set includes a window, where a sum of sampling points in the window is the largest and larger than the first preset value each time window sliding processing is performed on all the sampling points of the power sequence.

Specifically, window sliding processing may be performed on all the sampling points of the power sequence, a window is acquired, where a sum of numerical values of sampling points in the window is the largest and larger than the first preset value, and the numerical values of the sampling points in the window are set to the average value of the sampling points of the power sequence. Next, window sliding processing is performed again on all the sampling points of the power sequence, a window is acquired, where a sum of numerical values of sampling points in the window is the largest and larger than the first preset value, and the numerical values of the sampling points in the window are set to the average value of the sampling points of the power sequence. The rest may be deduced by analogy until a window is acquired, where a sum of numerical values of power sampling points in the window is no larger than the first preset value, and the number of acquired windows is smaller than the second preset value, or until the number of acquired windows is equal to the second preset value. In this way, a position corresponding to a sampling point in a window may be determined as the position of the sounding reference signal sampling point, where a sum of numerical values of sampling points in the window is the largest and larger than the first preset value in each cyclic process of window sliding processing.

In the embodiment of the present invention, numerical values of all or a part of sampling points in a window are set to the average value of the sampling points of the power sequence, where the sum of the numerical values of the sampling points in the window is larger than the first preset value, so that in a case that multiple sounding reference signal sources may exist and the sounding reference signal sources may overlap, a position of a sounding reference signal can be found more efficiently, thereby better eliminating the sounding reference signal.

In the embodiment of the present invention, the second preset value is preset according to the number of sounding reference signal sources and the preset window. For example, the number of sounding reference signal sources is determined according to the number of neighboring cells or the number of users located at an edge of a cell, where the number of the users is notified by a base station in the neighboring cell. Next, the second preset value is determined according to the number of the sounding reference signal sources and a size of the preset window. For example, when the number of the sounding reference signal sources is 1, where one sounding reference signal source has X sampling points, and the size of the preset window is Y, the second preset value is X/Y, and when X/Y is not an integer, a value may be obtained by rounding X/Y. When the number of the sounding reference signal sources is Z, the second preset value is ZX/Y, and when ZX/Y is not an integer, a value may be obtained by rounding ZX/Y. If a case that multiple sounding reference signal sources may overlap is considered, an overlapping situation of the sounding reference signal sources may be determined according to a position and state information of a neighboring cell, a position and state information of an edge user, and the like, and then the second preset value is determined according to the size of the preset window, which may be determined according to a specific situation, and is not limited in the embodiment of the present invention.

In the embodiment of the present invention, the first preset value is obtained according to a preset false alarm probability, where the preset false alarm probability may be determined according to a specific scenario, or a value may be obtained according to protocol stipulation, for example, a false alarm probability is stipulated to be 1% in an LTE protocol.

After the false alarm probability P (for example, 1%) is determined, emulation detection may be performed M times, where input signals in the M times are respectively a signal formed by a pure noise signal, a signal formed by a sounding reference signal, or a signal formed by a pure noise signal and a sounding reference signal. Next, detection results of the M times are arranged in descending order, first M*P detection results are clipped, and a smallest result in the sequence is a detection threshold. For example, the false alarm probability is 1%, and after detection is performed ten thousand times, results are x0, x1, . . . , x9999 in descending order, and accordingly, the detection threshold is x9, that is, x9 is the first preset value in the embodiment of the present invention.

To make the present invention be understood more clearly, the method for demodulating a PRACH signal in the embodiment of the present invention is described in the following with reference to FIG. 2.

Figure 2:
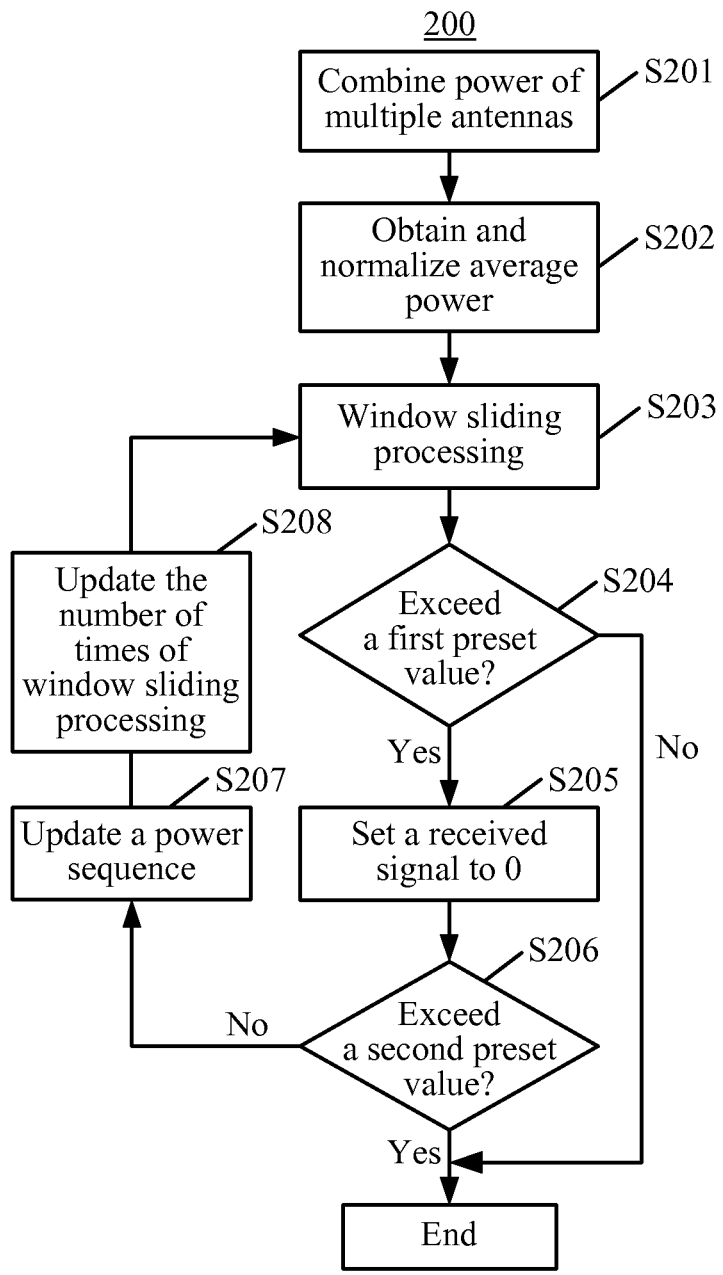
FIG. 2 is a schematic flow chart of a method for demodulating a PRACH signal according to another embodiment of the present invention.

FIG. 2 is a schematic flow chart of a method 200 for demodulating a PRACH signal according to an embodiment of the present invention. As shown in FIG. 2, the method 200 includes:

S201: After frequency spectrum migration and filtering decimation of a PRACH demodulation signal is performed to obtain a down-sampling sequence of the PRACH demodulation signal, signal simulation may be performed on a down-sampling sequence of each antenna, and a result is recorded as $e_k(n)$, where $k=0, 1, \ldots, N_{RX}-1$, and $N_{RX}$ is the total number of antennas; and then power of multiple antennas may be combined, and a sequence after combination is recorded as e(n):

$$e(n) = \sum_{k=0}^{N_{RX}} e_k(n), n = 0, 1, \ldots, N_{seq} - 1 \qquad \text{Formula 1}$$

where, $N_{seq}$ is the number of collected sampling points, and $N_{seq}=1536$; certainly, $N_{seq}$ may also be other values, which is not limited in the embodiment of the present invention.

S202: Calculate average power $\bar{e}$:

$$\bar{e} = \frac{1}{N_{seq}} \sum_{n=0}^{N_{seq}-1} e(n) \qquad \text{Formula 2}$$

and then obtain $\lambda(n)$ by normalizing the average power:

$$\lambda(n) = \frac{e(n)}{\bar{e}} \qquad \text{Formula 3}$$

S203: Perform window sliding processing, and record a processing result as s(n):

$$s(n) = \sum_{k=0}^{N_{window}-1} \lambda(n+k) \qquad \text{Formula 4}$$

where, $n=0, 1, \ldots, N_{seq}-N_{window}-1$, and $N_{window}$ is a size of a preset sliding window, that is, the number of sampling points that can be accommodated.

S204: Search for a maximum value $s_{MAX}$ of s(n):

$$s_{MAX}=\max\{s(n)\}, n=0,1, \ldots, N_{seq}-N_{window}-1 \qquad \text{Formula 5}$$

and determine whether $s_{MAX}$ exceeds a first preset value; if yes, perform S205; otherwise, end the process.

S205: When $s_{MAX}$ exceeds the first preset value, consider that a sounding reference signal exists in a received sequence, and set $N_{window}$ sampling points which are in the received sequence and start from $n_{MAX}$ to zero, where $n_{MAX}$ is a position corresponding to a first sampling point in a window corresponding to $s_{MAX}$.

S206: Determine whether the number of times of window sliding processing exceeds a second preset value; if no, perform S207; if yes, end the process for subsequent PRACH coherent detection.

S207: Set $N_{window}$ sampling points which are in the power sequence $\lambda(n)$ and start from $n_{MAX}$ to 1.

S208: Update the number of times of window sliding processing, that is, add 1 to the number of times of already performed window sliding processing; and then perform S203.

Therefore, in the embodiment of the present invention, a down-sampling sequence of a PRACH demodulation signal is acquired, a power sequence of the down-sampling sequence is acquired, a position of a sounding reference signal sampling point in the down-sampling sequence is determined according to the power sequence, and the sounding reference signal sampling point is eliminated according to the position of the sounding reference signal sampling point, so as to perform PRACH coherent detection on a down-sampling sequence obtained after the sounding reference signal sampling point is eliminated. In this way, interference from a sounding reference signal can be restrained, and false alarms in PRACH detection can be reduced.

In addition, a false alarm caused by the sounding reference signal may be avoided through other methods, for example, methods such as cell identifier and logic root sequence index planning, limiting a frequency domain position of a PRACH, and reducing a system bandwidth of the sounding reference signal, but all the methods have defects to different extents, for example, the planning method is complicated, it is required to plan a local cell and all neighboring cells that may cause interference, and the planning must be performed in a whole network range, so that implementation difficulty is further increased; the reducing the bandwidth of the sounding reference signal reduces a user capacity specification of the sounding reference signal; while in this method, no premise or assumption is performed on a cell identifier or logic root sequence index, the detection is performed in a time domain, and a frequency band position of the sounding reference signal is not limited, so that the defects of the foregoing two methods may be avoided.

The method for demodulating a PRACH signal in the embodiments of the present invention is described in the foregoing with reference to FIG. 1 and FIG. 2, and an apparatus for demodulating a PRACH signal according to an embodiment of the present invention is described in the following with reference to FIG. 3 to FIG. 6.

Figure 3:
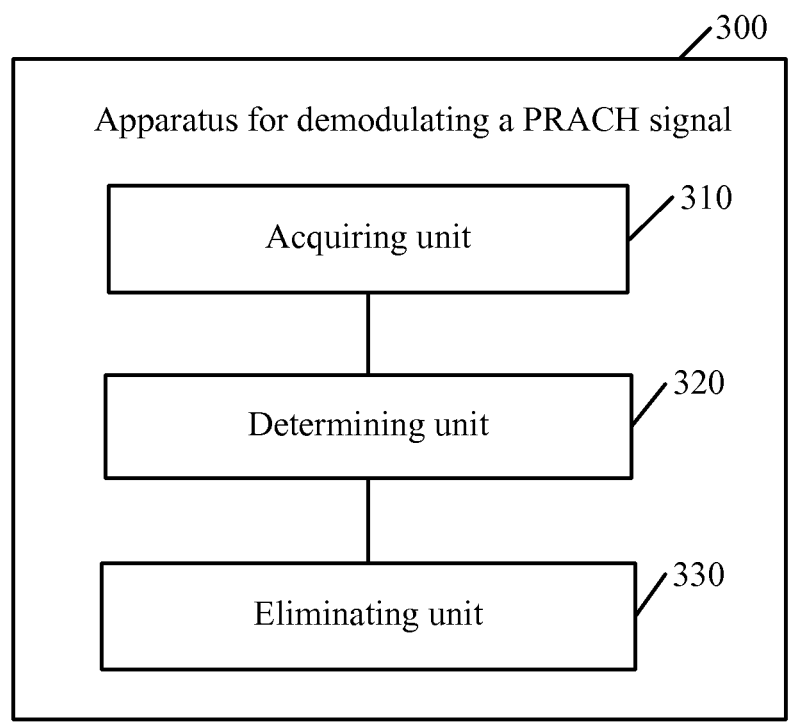
FIG. 3 is a schematic block diagram of an apparatus for demodulating a PRACH signal according to an embodiment of the present invention.

FIG. 3 is a schematic block diagram of an apparatus 300 for demodulating a PRACH signal according to an embodiment of the present invention. As shown in FIG. 3, the apparatus 300 includes:

an acquiring unit 310, configured to acquire a down-sampling sequence of a PRACH demodulation signal, and acquire a power sequence of the down-sampling sequence;

a determining unit 320, configured to determine a position of a sounding reference signal sampling point in the down-sampling sequence according to the power sequence; and an eliminating unit 330, configured to eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

Figure 4:
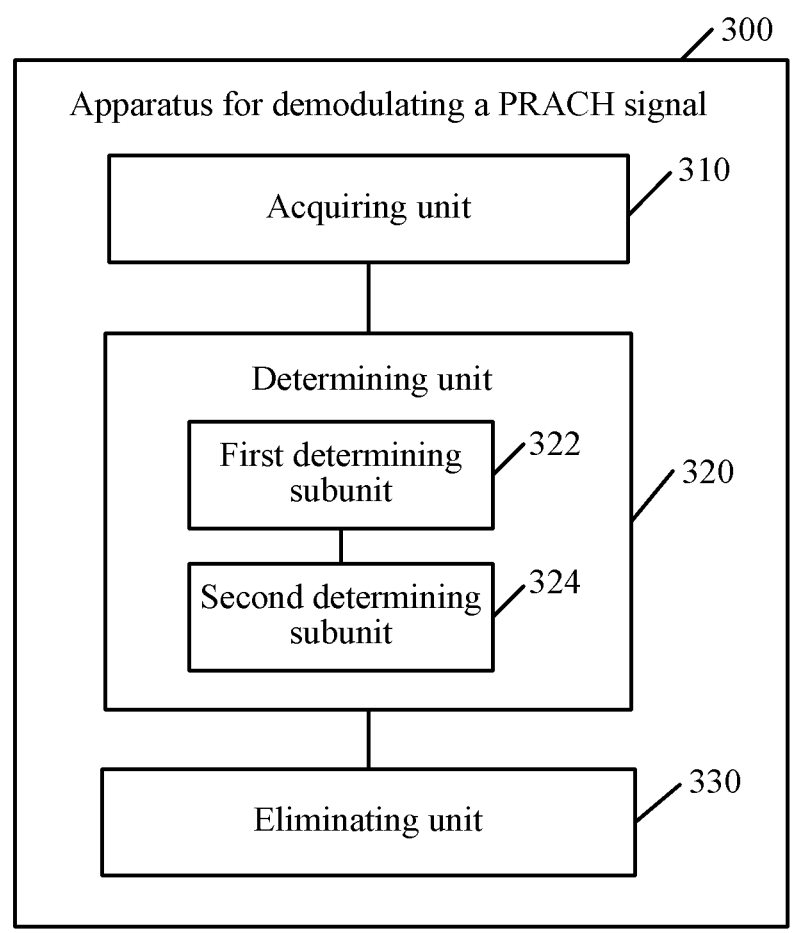
FIG. 4 is a schematic block diagram of an apparatus for demodulating a PRACH signal according to another embodiment of the present invention.

Optionally, as shown in FIG. 4, the determining unit 320 includes:

a first determining subunit 322, configured to perform window sliding processing on the power sequence according to a first preset value and a preset sliding window, so as to determine a first window set, where a sum of numerical values of sampling points in any window in the first window set is larger than the first preset value; and a second determining subunit 324, configured to determine a position corresponding to a sampling point in a window of the first window set as the position of the sounding reference signal.

Optionally, the first determining subunit 322 is specifically configured to:

sequentially perform window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

Optionally, the first determining subunit 322 is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(j-1)^{th}$ window have been set to the average value of the sampling points of the power sequence, acquire a $j^{th}$ window, where a sum of sampling points in the window is larger than the first preset value and is the largest, and set the numerical values of the sampling points in the $j^{th}$ window to the average value of the sampling points of the power sequence, where j is larger than 1 and is smaller than or equal to J−1;

perform window sliding processing on all the sampling points of the power sequence, where numerical values of sampling points in a $(J-1)^{th}$ window have been set to the average value of the sampling points of the power sequence, and acquire a $J^{th}$ window, where a sum of sampling points in the window is the largest, the sum of the numerical values of the sampling points in the $J^{th}$ window is no larger than the first preset value, and a sum of the numerical values of the sampling points in the $(J-1)^{th}$ window is larger than the first preset value; and determine the first window set, where the first window set includes a window, where a sum of sampling points in the window is the largest and larger than the first preset value each time window sliding processing is performed on all the sampling points of the power sequence.

Figure 5:
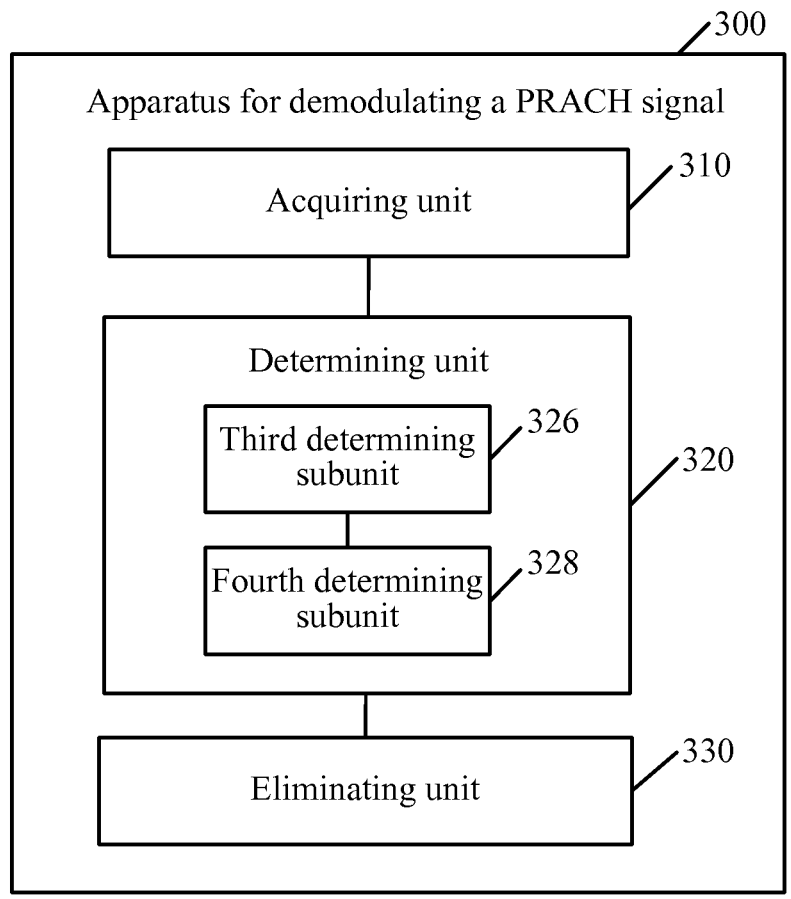
FIG. 5 is a schematic block diagram of an apparatus for demodulating a PRACH signal according to another embodiment of the present invention.

Optionally, as shown in FIG. 5, the determining unit 320 includes:

a third determining subunit 326, configured to perform window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and a fourth determining subunit 328, configured to determine a position corresponding to a sampling point in a window of the second window set as the position of the sounding reference signal.

Optionally, the third determining subunit 326 is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

Optionally, the third determining subunit 326 is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes K windows, where a sum of numerical values of sampling points in each of the windows is larger than the first preset value.

Optionally, the third determining subunit 326 is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(g-1)^{th}$ window have been set to the average value of the sampling points of the power sequence, acquire a $g^{th}$ window, where a sum of sampling points in the window is larger than the first preset value and is the largest, and set the numerical values of the sampling points in the $g^{th}$ window to the average value of the sampling points of the power sequence, where g is larger than 1 and is smaller than or equal to G−1;

perform window sliding processing on all the sampling points of the power sequence, where numerical values of sampling points in a $(G-1)^{th}$ window have been set to the average value of the sampling points of the power sequence, and acquire a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determine the second window set, where the second window set includes a window, where a sum of sampling points in the window is the largest and larger than the first preset value each time window sliding processing is performed on all the sampling points of the power sequence.

Optionally, the second preset value is preset according to the number of sounding reference signal sources and the preset window.

Optionally, the first preset value is obtained according to a preset false alarm probability.

Optionally, the eliminating unit 330 is specifically configured to:

set a value of a sampling point at the position of the sounding reference signal sampling point in the down-sampling sequence to 0 according to the position of the sounding reference signal sampling point.

It should be understood that, the foregoing and other operations and/or functions of the units of the apparatus 300 for demodulating a PRACH signal in the embodiment of the present invention are respectively for implementing the corresponding process of the method 100 in FIG. 1 or the corresponding process of the method 200 in FIG. 2, which are, for brevity of description, not repeatedly described herein.

Therefore, in the embodiment of the present invention, a down-sampling sequence of a PRACH demodulation signal is acquired, a power sequence of the down-sampling sequence is acquired, a position of a sounding reference signal sampling point in the down-sampling sequence is determined according to the power sequence, and the sounding reference signal sampling point is eliminated according to the position of the sounding reference signal sampling point, so as to perform PRACH coherent detection on a down-sampling sequence obtained after the sounding reference signal sampling point is eliminated. In this way, interference from a sounding reference signal can be restrained, and false alarms in PRACH detection can be reduced.

Figure 6:
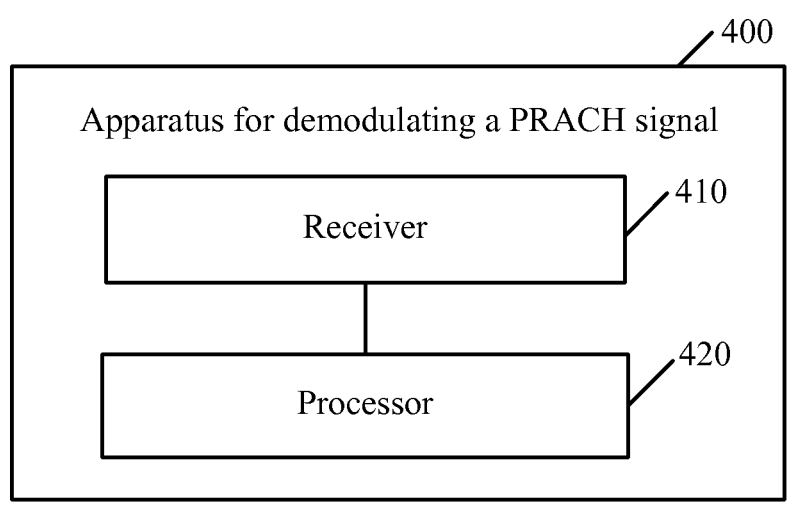
FIG. 6 is a schematic block diagram of an apparatus for demodulating a PRACH signal according to another embodiment of the present invention.

FIG. 6 is a schematic block diagram of an apparatus 400 for demodulating a PRACH signal according to an embodiment of the present invention. As shown in FIG. 6, the apparatus 400 includes:

a receiver 410, configured to receive a PRACH demodulation signal; and a processor 420, configured to acquire a down-sampling sequence of the PRACH demodulation signal, acquire a power sequence of the down-sampling sequence, determine a position of a sounding reference signal sampling point in the down-sampling sequence according to the power sequence, and eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

Optionally, the processor 420 is specifically configured to:

perform window sliding processing on the power sequence according to a first preset value and a preset sliding window, so as to determine a first window set, where a sum of numerical values of sampling points in any window in the first window set is larger than the first preset value; and determine a position corresponding to a sampling point in a window of the first window set as the position of the sounding reference signal.

Optionally, the processor 420 is specifically configured to:

sequentially perform window sliding processing on all sampling points of the power sequence according to the first preset value and the preset sliding window, so as to determine the first window set, where the sequentially performing window sliding processing on all sampling points of the power sequence, so as to determine the first window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the first window set, where the first window set includes all windows, where a sum of numerical values of sampling points in each of the windows is larger than the first preset value.

Optionally, the processor 420 is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(j-1)^{th}$ window have been set to the average value of the sampling points of the power sequence, acquire a $j^{th}$ window, where a sum of sampling points in the window is larger than the first preset value and is the largest, and set the numerical values of the sampling points in the $j^{th}$ window to the average value of the sampling points of the power sequence, where j is larger than 1 and is smaller than or equal to J−1;

perform window sliding processing on all the sampling points of the power sequence, where numerical values of sampling points in a $(J-1)^{th}$ window have been set to the average value of the sampling points of the power sequence, and acquire a $J^{th}$ window, where a sum of sampling points in the window is the largest, the sum of the numerical values of the sampling points in the $J^{th}$ window is no larger than the first preset value, and a sum of the numerical values of the sampling points in the $(J-1)^{th}$ window is larger than the first preset value; and determine the first window set, where the first window set includes a window, where a sum of sampling points in the window is the largest and larger than the first preset value each time window sliding processing is performed on all the sampling points of the power sequence.

Optionally, the processor 420 is specifically configured to:

perform window sliding processing on the power sequence according to a first preset value, a preset sliding window, and a second preset value, so as to determine a second window set, where the second window set includes at most K windows, a sum of numerical values of sampling points in any window in the second window set is larger than the first preset value, and a numerical value of K is equal to the second preset value; and determine a position corresponding to a sampling point in a window of the second window set as the position of the sounding reference signal.

Optionally, the processor 420 is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, where m is larger than 1 and is smaller than or equal to M−1;

determining a sum of numerical values of sampling points in an $M^{th}$ window, where M is a last window of the power sequence; and determining the second window set, where the second window set includes a window, where a sum of numerical values of sampling points in the window is larger than the first preset value, and the window belongs to the first K windows.

Optionally, the processor 420 is specifically configured to:

sequentially perform window sliding processing on all sampling points of the power sequence according to the first preset value, the preset sliding window, and the second preset value, so as to determine the second window set, where the sequentially performing window sliding processing on all sampling points of the power sequence, so as to determine the second window set, includes:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, where n is larger than 1 and is smaller than or equal to N−1;

determining a sum of numerical values of sampling points in an $N^{th}$ window, where the $N^{th}$ window is a window in a $K^{th}$ window, where a sum of numerical values of sampling points in the window is larger than the first preset value; and determining the second window set, where the second window set includes K windows, where a sum of numerical values of sampling points in each of the windows is larger than the first preset value.

Optionally, the processor 420 is specifically configured to:

perform window sliding processing on all sampling points in the power sequence, acquire a first window, where a sum of sampling points in the window is larger than the first preset value and is the largest, and set the numerical values of the sampling points in the first window to an average value of the sampling points of the power sequence;

perform window sliding processing on all the sampling points of the power sequence, where numerical values of sampling points in a $(g-1)^{th}$ window have been set to the average value of the sampling points of the power sequence, acquire a $g^{th}$ window, where a sum of sampling points in the window is larger than the first preset value and is the largest, and set the numerical values of the sampling points in the $g^{th}$ window to the average value of the sampling points of the power sequence, where g is larger than 1 and is smaller than or equal to G−1;

perform window sliding processing on all the sampling points of the power sequence, where numerical values of sampling points in a $(G-1)^{th}$ window have been set to the average value of the sampling points of the power sequence, and acquire a $G^{th}$ window, where a sum of sampling points in the window is the largest, G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value; and determine the second window set, where the second window set includes a window, where a sum of sampling points in the window is the largest and larger than the first preset value each time window sliding processing is performed on all the sampling points of the power sequence.

Optionally, the second preset value is preset according to the number of sounding reference signal sources and the preset window.

Optionally, the first preset value is obtained according to a preset false alarm probability.

Optionally, the processor 420 is specifically configured to:
set a value of a sampling point at the position of the sounding reference signal sampling point in the down-sampling sequence to 0 according to the position of the sounding reference signal sampling point.

It should be understood that, the foregoing and other operations and/or functions of the units of the apparatus 400 for demodulating a PRACH signal in the embodiment of the present invention are respectively for implementing the corresponding process of the method 100 in FIG. 1 or the corresponding process of the method 200 in FIG. 2, which are, for brevity of description, not repeatedly described herein.

Therefore, in the embodiment of the present invention, a down-sampling sequence of a PRACH demodulation signal is acquired, a power sequence of the down-sampling sequence is acquired, a position of a sounding reference signal sampling point in the down-sampling sequence is determined according to the power sequence, and the sounding reference signal sampling point is eliminated according to the position of the sounding reference signal sampling point, so as to perform PRACH coherent detection on a down-sampling sequence obtained after the sounding reference signal sampling point is eliminated. In this way, interference from a sounding reference signal can be restrained, and false alarms in PRACH detection can be reduced.

A person of ordinary skill in the art may be aware that, units and algorithm steps of examples described in combination with the embodiments disclosed in this specification can be implemented by electronic hardware, or a combination of computer software and electronic hardware. Whether these functions are performed in a hardware or software manner depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiments are merely exemplary. For example, dividing of the units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for demodulating a physical random access channel (PRACH) signal, comprising:
   acquiring by a processor, a down-sampling sequence of a PRACH demodulation signal;
   acquiring, by the processor, a power sequence of the down-sampling sequence;
   determining, by the processor, a position of a sounding reference signal sampling point in the down-sampling sequence according to the power sequence; and
   eliminating, by the processor, the sounding reference signal sampling point in the down-sampling sequence according to the position of the sounding reference signal sampling point, so as to perform PRACH coherent detection on a down-sampling sequence obtained after the sounding reference signal sampling point is eliminated.

2. The method according to claim 1, wherein the determining a position of a sounding reference signal sampling point in the down-sampling sequence comprises:

performing window sliding processing on the power sequence according to a first preset value and a preset sliding window, so as to determine a first window set, wherein a sum of numerical values of sampling points in any window in the first window set is larger than the first preset value; and determining a position corresponding to a sampling point in a window of the first window set as the position of the sounding reference signal.

3. The method according to claim 2, wherein the performing window sliding processing on the power sequence, so as to determine a first window set, comprises:

sequentially performing window sliding processing on all sampling points of the power sequence according to the first preset value and the preset sliding window, so as to determine the first window set, wherein the sequentially performing window sliding processing on all sampling points of the power sequence, so as to determine the first window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, wherein m is larger than 1 and is smaller than or equal to M−1;

determining a sum of numerical values of sampling points in an $M^{th}$ window, wherein M is a last window of the power sequence; and determining the first window set, wherein the first window set comprises all windows, wherein a sum of numerical values of sampling points in each of the windows is larger than the first preset value.

4. The method according to claim 2, wherein the performing window sliding processing on the power sequence, so as to determine a first window set, comprises:

performing window sliding processing on all sampling points in the power sequence, acquiring a first window, wherein a sum of sampling points in the first window is larger than the first preset value, and setting the numerical values of the sampling points in the first window to an average value of the sampling points of the power sequence;

performing window sliding processing on all the sampling points of the power sequence, wherein numerical values of sampling points in a $(j-1)^{th}$ window have been set to the average value of the sampling points of the power sequence, acquiring a $j^{th}$ window, wherein a sum of sampling points in the $j^{th}$ window is larger than the first preset value, and setting the numerical values of the sampling points in the $j^{th}$ window to the average value of the sampling points of the power sequence, wherein j is larger than 1 and is smaller than or equal to J−1, and J is larger than j;

performing window sliding processing on all the sampling points of the power sequence, wherein numerical values of sampling points in a $(J-1)^{th}$ window have been set to the average value of the sampling points of the power sequence, and acquiring a $J^{th}$ window, the sum of the numerical values of the sampling points in the $J^{th}$ window is no larger than the first preset value, and a sum of the numerical values of the sampling points in the $(J-1)^{th}$ window is larger than the first preset value; and determining the first window set, wherein the first window set comprises a window, wherein a sum of sampling points in the window is larger than the first preset value each time window sliding processing is performed on all the sampling points of the power sequence.

5. The method according to claim 1, wherein the determining a position of a sounding reference signal sampling point in the down-sampling sequence comprises:

performing window sliding processing on the power sequence according to a first preset value, a preset sliding window, and a second preset value, so as to determine a second window set, wherein the second window set comprises at most K windows, a sum of numerical values of sampling points in any window in the second window set is larger than the first preset value, and a numerical value of K is equal to the second preset value; and determining a position corresponding to a sampling point in a window of the second window set as the position of the sounding reference signal.

6. The method according to claim 5, wherein the performing window sliding processing on the power sequence, so as to determine a second window set, comprises:

sequentially performing window sliding processing on all sampling points of the power sequence according to the first preset value, the preset sliding window, and the second preset value, so as to determine the second window set, wherein the sequentially performing window sliding processing on all sampling points of the power sequence, so as to determine the second window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, wherein m is larger than 1 and is smaller than or equal to M−1;

determining a sum of numerical values of sampling points in an $M^{th}$ window, wherein M is a last window of the power sequence; and determining the second window set, wherein the second window set comprises a window, wherein a sum of numerical values of sampling points in the window is larger than the first preset value, and the window belongs to first K windows.

7. The method according to claim 5, wherein the performing window sliding processing on the power sequence, so as to determine a second window set, comprises:

sequentially performing window sliding processing on all sampling points of the power sequence according to the first preset value, the preset sliding window, and the second preset value, so as to determine the second window set, wherein the sequentially performing window sliding processing on all sampling points of the power sequence, so as to determine the second window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, wherein n is larger than 1 and is smaller than or equal to N−1, and N is larger than n;

determining a sum of numerical values of sampling points in an $N^{th}$ window, wherein the $N^{th}$ window is a window in a $K^{th}$ window, wherein a sum of numerical values of sampling points in the window is larger than the first preset value; and determining the second window set, wherein the second window set comprises K windows, wherein a sum of numerical values of sampling points in each of the K windows is larger than the first preset value.

8. The method according to claim 5, wherein the performing window sliding processing on the power sequence, so as to determine a second window set, comprises:

performing window sliding processing on all sampling points in the power sequence, acquiring a first window, wherein a sum of sampling points in the window is larger than the first preset value, and setting the numerical values of the sampling points in the first window to an average value of the sampling points of the power sequence;

performing window sliding processing on all the sampling points of the power sequence, wherein numerical values of sampling points in a $(g−1)^{th}$ window have been set to the average value of the sampling points of the power sequence, acquiring a $g^{th}$ window, wherein a sum of sampling points in the window is larger than the first preset value, and setting the numerical values of the sampling points in the $g^{th}$ window to the average value of the sampling points of the power sequence, wherein g is larger than 1 and is smaller than or equal to G−1, and G is larger than g;

performing window sliding processing on all the sampling points of the power sequence, wherein numerical values of sampling points in a $(G−1)^{th}$ window have been set to the average value of the sampling points of the power sequence, and acquiring a $G^{th}$ window, wherein G is equal to K, and a sum of the numerical values of the sampling points in the $(G−1)^{th}$ window is larger than the first preset value, or G is smaller than K, the sum of the numerical values of the sampling points in the $G^{th}$ window is no larger than the first preset value, and a sum of the numerical values of the sampling points in the $(G−1)^{th}$ window is larger than the first preset value; and determining the second window set, wherein the second window set comprises a window, wherein a sum of sampling points in the window is larger than the first preset value each time window sliding processing is performed on all the sampling points of the power sequence.

9. The method according to claim 5, wherein the second preset value is preset according to the number of sounding reference signal sources and the preset sliding window.

10. The method according to claim 1, wherein the eliminating the sounding reference signal sampling point comprises:

setting a value of a sampling point at the position of the sounding reference signal sampling point in the down-sampling sequence to 0 according to the position of the sounding reference signal sampling point.

11. An apparatus for demodulating a physical random access channel (PRACH) signal, comprising:

a receiver, configured to receive a PRACH demodulation signal; and a processor, configured to acquire a down-sampling sequence of the PRACH demodulation signal, acquire a power sequence of the down-sampling sequence, determine a position of a sounding reference signal sampling point in the down-sampling sequence according to the power sequence, and eliminate the sounding reference signal sampling point in the down-sampling sequence according to the position of the sounding reference signal sampling point, so as to perform PRACH coherent detection on a down-sampling sequence obtained after the sounding reference signal sampling point is eliminated.

12. The apparatus according to claim 11, wherein the processor is configured to:

perform window sliding processing on the power sequence according to a first preset value and a preset sliding window, so as to determine a first window set, wherein a sum of numerical values of sampling points in any window in the first window set is larger than the first preset value; and determine a position corresponding to a sampling point in a window of the first window set as the position of the sounding reference signal.

13. The apparatus according to claim 12, wherein the processor is configured to:

sequentially perform window sliding processing on all sampling points of the power sequence according to the first preset value and the preset sliding window, so as to determine the first window set, wherein the sequentially performing window sliding processing on all sampling points of the power sequence, so as to determine the first window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, wherein m is larger than 1 and is smaller than or equal to M−1;

determining a sum of numerical values of sampling points in an $M^{th}$ window, wherein M is a last window of the power sequence; and determining the first window set, wherein the first window set comprises all windows, wherein a sum of numerical values of sampling points in each of the M windows is larger than the first preset value.

14. The apparatus according to claim 12, wherein the processor is configured to:

perform window sliding processing on all sampling points in the power sequence, acquire a first window, wherein a sum of sampling points in the window is larger than the first preset value, and set the numerical values of the sampling points in the first window to an average value of the sampling points of the power sequence;

perform window sliding processing on all the sampling points of the power sequence, wherein numerical values of sampling points in a $(j-1)^{th}$ window have been set to the average value of the sampling points of the power sequence, acquire a $j^{th}$ window, wherein a sum of sampling points in the window is larger than the first value, and set the numerical values of the sampling points in the $j^{th}$ window to the average value of the sampling points of the power sequence, wherein j is larger than 1 and is smaller than or equal to J−1, and J is larger than j;

perform window sliding processing on all the sampling points of the power sequence, wherein numerical values of sampling points in a $(J-1)^{th}$ window have been set to the average value of the sampling points of the power sequence, and acquire a $J^{th}$ window, wherein the sum of the numerical values of the sampling points in the $J^{th}$ window is no larger than the first preset value, and a sum of the numerical values of the sampling points in the $(J-1)^{th}$ window is larger than the first preset value; and determine the first window set, wherein the first window set comprises a window, wherein a sum of sampling points in the window is larger than the first preset value each time window sliding processing is performed on all the sampling points of the power sequence.

15. The apparatus according to claim 11, wherein the processor is configured to:

perform window sliding processing on the power sequence according to a first preset value, a preset sliding window, and a second preset value, so as to determine a second window set, wherein the second window set comprises at most K windows, a sum of numerical values of sampling points in any window in the second window set is larger than the first preset value, and a numerical value of K is equal to the second preset value; and determine a position corresponding to a sampling point in a window of the second window set as the position of the sounding reference signal.

16. The apparatus according to claim 15, wherein the processor is configured to:

sequentially perform window sliding processing on all sampling points of the power sequence according to the first preset value, the preset sliding window, and the second preset value, so as to determine the second window set, wherein the sequentially performing window sliding processing on all sampling points of the power sequence, so as to determine the second window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $m^{th}$ window, and when the sum of the numerical values of the sampling points in the $m^{th}$ window is larger than the first preset value, setting a numerical value of a sampling point which is in the $m^{th}$ window and belongs to an $(m+1)^{th}$ window to the average value of the sampling points of the power sequence, wherein m is larger than 1 and is smaller than or equal to M−1;

determining a sum of numerical values of sampling points in an $M^{th}$ window, wherein M is a last window of the power sequence; and determining the second window set, wherein the second window set comprises a window, wherein a sum of numerical values of sampling points in the window is larger than the first preset value, and the window belongs to first K windows.

17. The apparatus according to claim 15, wherein the processor is configured to:

sequentially perform window sliding processing on all sampling points of the power sequence according to the first preset value, the preset sliding window, and the second preset value, so as to determine the second window set, wherein the sequentially performing window sliding processing on all sampling points of the power sequence, so as to determine the second window set, comprises:

determining a sum of numerical values of sampling points in a first window, and when the sum of the numerical values of the sampling points in the first window is larger than the first preset value, setting a numerical value of a sampling point which is in the first window and belongs to a second window to an average value of the sampling points of the power sequence;

determining a sum of numerical values of sampling points in an $n^{th}$ window, and when the sum of the numerical values of the sampling points in the $n^{th}$ window is larger than the first preset value, setting a numerical value of a sampling point which is in the $n^{th}$ window and belongs to an $(n+1)^{th}$ window to the average value of the sampling points of the power sequence, wherein n is larger than 1 and is smaller than or equal to N−1, and N is larger than n;

determining a sum of numerical values of sampling points in an $N^{th}$ window, wherein the $N^{th}$ window is a window in a $K^{th}$ window, wherein a sum of numerical values of sampling points in the window is larger than the first preset value; and determining the second window set, wherein the second window set comprises K windows, wherein a sum of numerical values of sampling points in each of the windows is larger than the first preset value, and a numerical value of K is equal to the second preset value.

18. The apparatus according to claim 15, wherein the processor is configured to:

perform window sliding processing on all sampling points in the power sequence, acquire a first window, wherein a sum of sampling points in the window is larger than the first preset value, and set the numerical values of the sampling points in the first window to an average value of the sampling points of the power sequence;

perform window sliding processing on all the sampling points of the power sequence, wherein numerical values of sampling points in a $(g-1)^{th}$ window have been set to the average value of the sampling points of the power sequence, acquire a $g^{th}$ window, wherein a sum of sampling points in the window is larger than the first preset value, and set the numerical values of the sampling points in the $g^{th}$ window to the average value of the sampling points of the power sequence, wherein g is larger than 1 and is smaller than or equal to G−1, and G is larger than q;

perform window sliding processing on all the sampling points of the power sequence, wherein numerical values of sampling points in a $(G-1)^{th}$ window have been set to the average value of the sampling points of the power sequence, and acquire a $G^{th}$ window, wherein G is equal to K, and a sum of the numerical values of the sampling points in the $(G-1)^{th}$ window is larger than the first preset value, or G is smaller than K, the sum of the numerical values of the sampling points in the $G^{th}$ window is no larger than the first preset value, and a sum of the numerical values of the sampling points in the $(G-1)^{th}$ window is larger than the first preset value, and a numerical value of K is equal to the second preset value; and determine the second window set, wherein the second window set comprises a window, wherein a sum of sampling points in the window is larger than the first preset value each time window sliding processing is performed on all the sampling points of the power sequence.

19. The apparatus according to claim 15, wherein the second preset value is preset according to the number of sounding reference signal sources and the preset window.

20. The apparatus according to claim 11, wherein the processor is configured to:
set a value of a sampling point at the position of the sounding reference signal sampling point in the down-sampling sequence to 0 according to the position of the sounding reference signal sampling point.

* * * * *